United States Patent
Rippetoe et al.

[11] Patent Number: 6,036,849
[45] Date of Patent: Mar. 14, 2000

[54] PROCESS FOR THE REMOVAL OF HYDROCARBONS FROM SOILS

[75] Inventors: William W. Rippetoe, Bixby; David N. Shroff, Broken Arrow, both of Okla.

[73] Assignee: Universal Environmental Technologies Inc., Naples, Fla.

[21] Appl. No.: 08/671,664

[22] Filed: Jun. 28, 1996

[51] Int. Cl.⁷ .............................. C10G 17/00; B09B 1/00; A01G 27/00; C02F 1/68

[52] U.S. Cl. ......................... 208/177; 208/188; 208/284; 208/295; 208/428; 208/435; 405/128; 71/1; 71/903; 210/761; 210/631; 210/925

[58] Field of Search ..................... 208/177, 188, 208/284, 295, 428, 435; 405/128; 71/1, 903; 210/761, 631, 925

[56] References Cited

U.S. PATENT DOCUMENTS

| | | | |
|---|---|---|---|
| 4,787,323 | 11/1988 | Beer et al. | 110/346 |
| 4,882,021 | 11/1989 | Barnhart | 204/157.15 |
| 4,927,293 | 5/1990 | Campbell | 405/128 |
| 5,053,142 | 10/1991 | Sorensen et al. | 210/912 |
| 5,282,695 | 2/1994 | Crosby et al. | 405/128 |
| 5,295,761 | 3/1994 | Heacock et al. | 405/128 |
| 5,368,411 | 11/1994 | Losack | 405/128 |
| 5,370,801 | 12/1994 | Soresen et al. | 210/912 |
| 5,415,777 | 5/1995 | Krempen et al. | 435/262.5 |
| 5,417,864 | 5/1995 | Varadaraj | 210/703 |
| 5,525,008 | 6/1996 | Wilson | 405/128 |
| 5,611,642 | 3/1997 | Wilson | 405/128 |
| 5,625,119 | 4/1997 | Tischler | 588/205 |

Primary Examiner—Mark L. Bell
Assistant Examiner—Patricia L. Hailey

[57] ABSTRACT

A method of removing hydrocarbons from soils contaminated with various hydrocarbons such as gasoline, diesel fuel, solvents, motor oil and crude oil. The process first screens the soil to remove oversized rocks and debris and to reduce the contaminated soil to uniformly sized particles. The soil particles are moved along a conveyor and first sprayed with an oxidizer diluted with ionized water and then sprayed with only ionized water. The washed particles are then vigorously mixed with their entrained oxidizer and ionized water in an auger mixer for several minutes to oxidize almost all of the remaining hydrocarbons. The washed and hydrocarbon-free soil is then moved by conveyor to a stockpile for storage, testing and drying.

3 Claims, 2 Drawing Sheets

Soil Treatment Process Flow Diagram

PROCESS FOR THE REMOVAL OF HYDROCARBONS FROM SOILS

FIELD OF THE INVENTION

Our invention lies in the field of remediating contaminated soils and more particularly to the removal of accidentally or intentionally deposited oil and other hydrocarbons from various types of soil.

BACKGROUND OF THE INVENTION

In the past and at present, there are three methods for treating hydrocarbon contaminated soils, namely, incineration, bioremediation and soil washing. Incineration has the inherent cost disadvantages of high energy costs and transporting the soil to and from a usually remote incinerator. Bioremediation has the inherent disadvantages of low throughput, sensitivity to changes in temperature, uneven results and the extended period of time required to complete remediation. Most common soil washing techniques use surfactants to float out the hydrocarbons into the wash water requiring costly continuous water treatment to extract the hydrocarbons from the aqueous phase and have difficulty in reducing contamination to regulatory limits. Conventional soil washing, if it works, has a limited production volume.

Due to the high cost of cleaning contaminated soil, there exists throughout the United States millions of tons of soil contaminated with hydrocarbons located within such installations as oil refineries, industrial plants, airports, motor vehicle repair shops, auto service stations and military training areas.

Accordingly, there is a need for a high volume low cost method of efficiently removing hydrocarbons from contaminated soils.

There is also a need for a method of removing hydrocarbons from contaminated soils with portable equipment that can be moved from one contaminated site to another.

SUMMARY OF THE INVENTION

Our invention involves the use of at least one Ion Collider™ as shown and described in U.S. Pat. No. 5,482,629 issued Jan. 9, 1996. As taught in our patent application no. PCT/US95/01113 filed Jan. 25, 1995, water pumped through an Ion Collider ionizes the water and alters its physical characteristics. All embodiments of our invention use Ion Collier treated water and the use of surfactants is totally eliminated.

Soils contaminated with spilled or otherwise deposited hydrocarbons in the range of $C_8$ to $C_{40}$, such as diesel fuel, gasoline, jet fuel motor oil, cutting oils and crude oil, are first passed through a screening process to eliminate oversized rocks and debris and to reduce the soil to uniformly sized particles. The resulting particles are sprayed with an oxidizer diluted with Ion Collier treated water and then vigorously mixed in an auger mixer for several minutes with the entrained oxidizer and Ion Collider treated water. This vigorous mixing of the soil particles, the oxidizer and the Ion Collider treated water oxidizes the hydrocarbons, leaving the washed soil with minimal hydrocarbons well below regulatory limits. Neither Ion Collider treated water, its spraying nor the oxidizing process itself creates prohibited products. Our method is environmentally safe.

In the case of soils contaminated with crude or other heavy oils, we may increase the volume or strength of the oxidizer and/or increase the time of vigorous mixing of the soil, the oxidizer and the ionized water to produce washed soils whose hydrocarbon content are well below regulatory limits.

DETAILED DESCRIPTION OF THE PREFERRED EMBODIMENT

Figure 1:
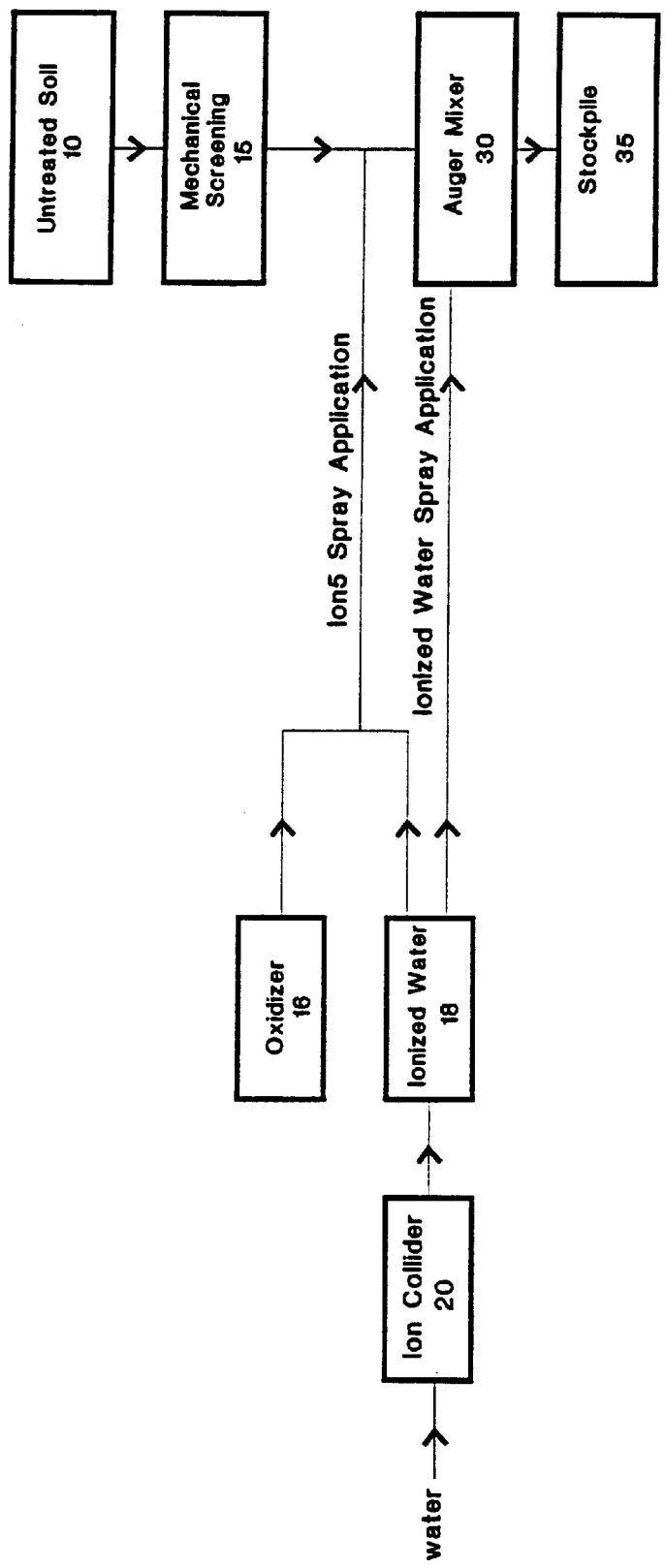
FIG. 1 is a flow diagram of a preferred embodiment of our invention for treating soils contaminated with various types of hydrocarbons.

FIG. 1 is a flow diagram of our method presently being used at the Miami International Airport in Dade County, Florida for cleaning soils contaminated with spilled or deposited gasoline, diesel fuel, motor oil, hydraulic fluid and other hydrocarbons.

Figure 2:
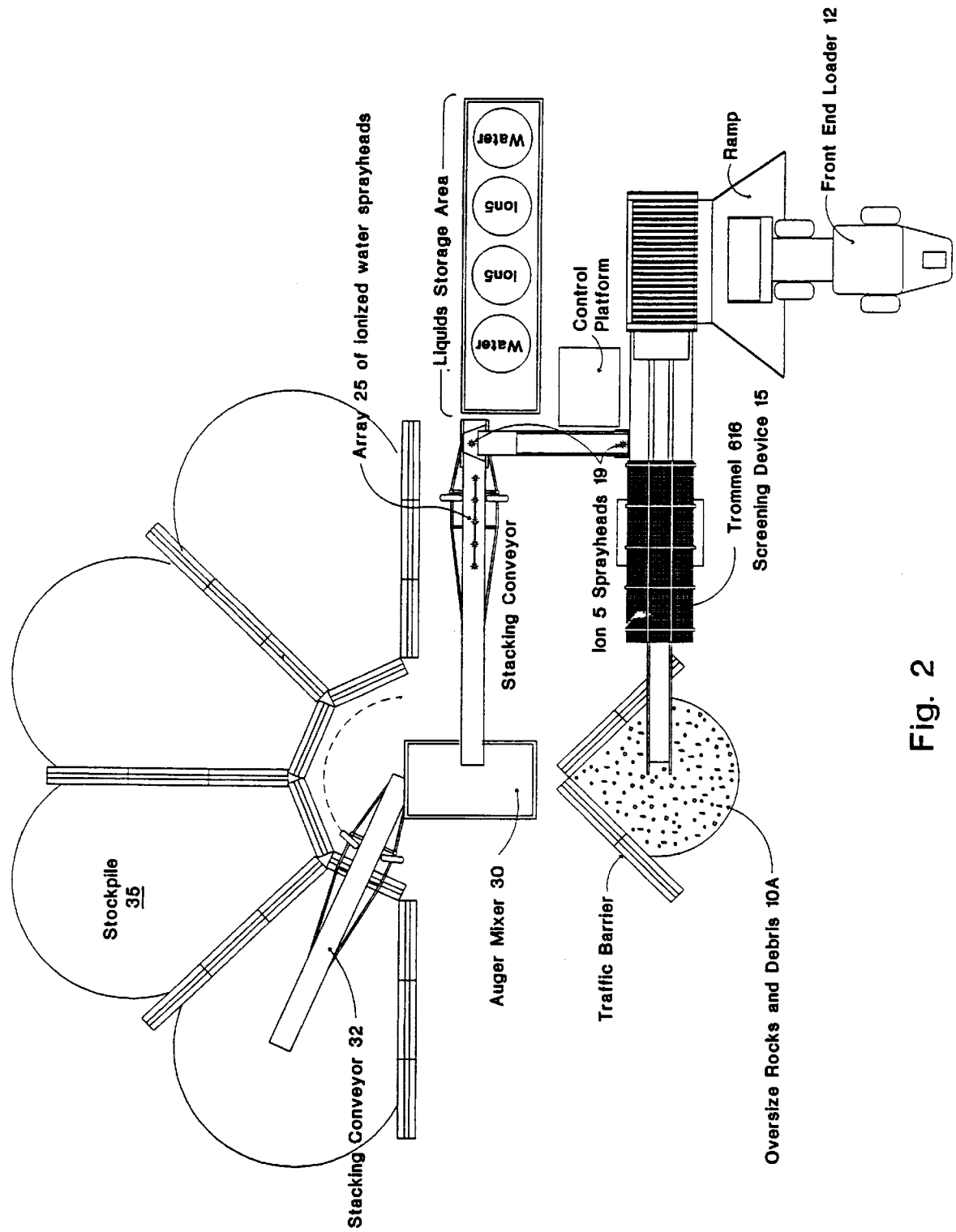
FIG. 2 illustrates the actual equipment we have used to treat soil contaminated with spilled gasoline, diesel fuel, jet fuel, motor oils and various other hydrocarbons.

FIG. 2. is a plan view of the actual equipment used to carry out our method of cleaning soils shown in FIG. 1.

Contaminated and untreated soil 10 is transported preferably by front end loaders 12 to a mechanical screening device 15 such as a Trommel™ 616 to reduce the soil to uniformly sized particles from which oversized rocks and debris 10A are removed and discarded as shown in FIG. 2.

The soil particles resulting from the screening process are sprayed with an oxidizer 16 such as potassium permanganate diluted to a concentration of between 275 to 1000 milligrams of oxidizer to a liter of ionized water 18, that is, water which has been passed through an Ion Collider 20 and thereby electrically charged, i.e. ionized. Two sprayheads 19 spraying oxidizer 16 diluted with ionized water 18 are shown in FIG. 2.

The two storage tanks marked Ion5 in the liquids storage area shown in FIG. 2 are filled with oxidizer 16 diluted with ionized water and the two storage tanks marked water contain ionized water used in our unique method of removing hydrocarbons from soils.

Following their being sprayed with an oxidizer diluted with ionized water from Ion5 sprayheads 19, the soil particles as they are moved along a conveyor are sprayed with ionized water 18 from an array 25 of spray nozzles as shown in FIG. 2. The washed soil particles are then vigorously mixed for several minutes with the entrained oxidizer and ionized water in an Eagle™ 24 auger mixer 30 as shown in both FIGS. 1 and 2. The process oxidizes the remaining hydrocarbons, leaving the washed soil almost totally free of hydrocarbons.

The washed and hydrocarbon-free soil is fed from the auger mixer 30 along a stacking conveyor 32 to be stored until testing is completed in one of a series of stockpiles 35 as shown in FIG. 2.

While we have shown and described a preferred embodiment of our method of removing hydrocarbons from soils, the scope and spirit of our invention is in no way limited to that embodiment. The scope of our invention is limited only by the appended claims.

We claim:

1. A method of removing hydrocarbons from soils contaminated with deposited hydrocarbons comprising removing oversized rocks and debris and converting the remaining contaminated soil into uniformly sized particles, spraying the soil particles with an oxidizer diluted with ionized water, vigorously mixing the sprayed soil particles with its entrained oxidizer and ionized water in an auger mixer for several minutes thereby oxidizing almost all of the hydrocarbons remaining in the soil, and removing the washed and hydrocarbon-free soil particles from the auger mixer to be stored, tested and dried.

2. A method of removing hydrocarbons from soils contaminated with deposited hydrocarbons as set forth in claim 1 in which the soil particles are sprayed with ionized water following their being sprayed with an oxidizer diluted with ionized water but before the particles are vigorously mixed with entrained oxidizer and ionized water in an auger mixer.

3. A method of removing hydrocarbons from soils contaminated with deposited hydrocarbons as set forth in claim 1 in which the oxidizer is potassium permanganate diluted to a concentration of from 275 to 1,000 milligrams of potassium permanganate to one liter of ionized water.

* * * * *